United States Patent
Kaczmarczyk et al.

(10) Patent No.: US 6,950,441 B1
(45) Date of Patent: Sep. 27, 2005

(54) SYSTEM AND METHOD TO INTERNETWORK TELECOMMUNICATION NETWORKS OF DIFFERENT PROTOCOLS

(75) Inventors: Casimir M. Kaczmarczyk, Plano, TX (US); Sivakumar Ravikumar, Dublin, OH (US)

(73) Assignee: Sonus Networks, Inc., Chelmsford, MA (US)

(*) Notice: Subject to any disclaimer, the term of this patent is extended or adjusted under 35 U.S.C. 154(b) by 0 days.

(21) Appl. No.: 09/538,040

(22) Filed: Mar. 29, 2000

Related U.S. Application Data

(60) Provisional application No. 60/127,169, filed on Mar. 30, 1999.

(51) Int. Cl.[7] .......................... H04L 12/66; H04L 12/56; H04L 12/28
(52) U.S. Cl. .................. 370/467; 370/352; 370/401; 370/410
(58) Field of Search ................ 370/352, 401, 370/410, 465–467, 353, 357

(56) References Cited

U.S. PATENT DOCUMENTS

| | | | | |
|---|---|---|---|---|
| 5,022,024 | A | | 6/1991 | Paneth et al. ............... 370/50 |
| 6,041,109 | A | | 3/2000 | Cardy et al. ............... 379/201 |
| 6,134,589 | A | | 10/2000 | Hultgren ..................... 709/227 |
| 6,185,292 | B1 | | 2/2001 | Miloslavsky ............... 379/265 |
| 6,252,952 | B1 | | 6/2001 | Kung et al. ................. 379/114 |
| 6,301,609 | B1 | | 10/2001 | Aravamudan et al. ...... 709/207 |
| 6,373,817 | B1 | | 4/2002 | Kung et al. ................. 370/217 |
| 6,418,205 | B2 | * | 7/2002 | Capers et al. ........... 379/112.01 |
| 6,434,143 | B1 | | 8/2002 | Donovan ..................... 370/356 |
| 6,445,784 | B2 | | 9/2002 | Uppaluru et al. ...... 379/220.01 |
| 6,459,708 | B1 | | 10/2002 | Cox et al. ................... 370/537 |
| 6,522,876 | B1 | | 2/2003 | Weiland et al. ............. 455/414 |
| 6,529,499 | B1 | * | 3/2003 | Doshi et al. ................ 370/352 |
| 6,570,855 | B1 | | 5/2003 | Kung et al. ................. 370/237 |
| 6,614,781 | B1 | * | 9/2003 | Elliott et al. ............... 370/352 |
| 6,650,619 | B1 | * | 11/2003 | Schuster et al. ............ 370/230 |
| 6,704,287 | B1 | | 3/2004 | Moharram .................. 370/242 |
| 2001/0054085 | A1 | | 12/2001 | Kurganov .................. 709/218 |
| 2002/0120691 | A1 | | 8/2002 | Patil et al. .................. 709/206 |
| 2003/0028561 | A1 | | 2/2003 | Gounares et al. .......... 707/513 |
| 2003/0058277 | A1 | | 3/2003 | Bowman-Amuah ........ 345/765 |
| 2003/0140121 | A1 | | 7/2003 | Adams ....................... 709/219 |

FOREIGN PATENT DOCUMENTS

GB 2326054 * 12/1998 ........... H04L/12/56

OTHER PUBLICATIONS

"Cisco and Motorola Form Strategic Alliance to Build Internet-Based Wireless Networks" Press Release, Feb. 8, 1999.

* cited by examiner

*Primary Examiner*—Chi Pham
*Assistant Examiner*—Ronald Abelson
(74) *Attorney, Agent, or Firm*—Proskauer Rose LLP

(57) ABSTRACT

A softswitch interconnecting networks of different transport protocols is provided. The softswitch includes a signaling agent coupled to the networks and operable to receive incoming signaling messages, translate the incoming signaling messages to a call model event, and route the call model event. The softswitch further includes a call agent in communication with the signaling agent and operable to receive the call model event, request outgoing resources for establishing data sessions, generate outgoing signaling messages, and send the outgoing signaling messages to the signaling agent. The signaling agent then terminates the data sessions on the requested outgoing resources.

32 Claims, 12 Drawing Sheets

SYSTEM AND METHOD TO INTERNETWORK TELECOMMUNICATION NETWORKS OF DIFFERENT PROTOCOLS

RELATED PATENT APPLICATION

This application claims benefit of U.S. Ser. No. 60/127,169, entitled INtelligentIP, filed on Mar. 30, 1999.

TECHNICAL FIELD OF THE INVENTION

This invention is related in general to the field of telecommunications. More particularly, the invention is related to system and method to internetwork telecommunication networks of different protocols.

BACKGROUND OF THE INVENTION

In the short span of five years, the Internet has changed inter-personal and inter-organizational communication. This phenomenon is largely the result of an open control language of protocol, the Internet Protocol (IP). The introduction of new control vocabularies and syntax, such as the Hypertext Transfer Protocol (HTTP), expanded the Internet into the World Wide Web (WWW), a multimedia communications distribution network with any-to-any connectivity. Other manifestations or generations of IP are evolving, which will have equally profound impact, such as one that is transforming the public switched telephone network (PSTN).

The command and control of the PSTN is built around a connection-oriented class structure. Call processing is completed by a complex array of switches, processors, and control networks, such as the Signaling System 7 or SS7. The PSTN is built on a class structure of specialized devices that perform single-purpose functions. For example, a Class 5 switch provides local access and call waiting; a Class 4 switch provides long distance, toll calls, and billing. Connectivity is also connection-oriented, where two devices must establish a discrete, deterministic connection or voice channel before communication can begin. The voice channel also must remain in place for the duration of the call. The PSTN is also a hierarchical one-to-many network that may result in traffic congestion, or blocking, thus creating the need for centralized control to proactively re-route the traffic. New service and feature development on this complex network is time consuming and strenuous, requiring 12–18 months of development. Service providers are spending billions of dollars annually to support this specialized infrastructure, as margin continues to erode and new development has stagnated.

The expanding interest in IP telephony has been driven by the opportunity to reduce network costs. IP-based communication is both classless and connectionless. IP networks deconstruct the class-based switch hierarchy into a powerful, any-to-any, class-independent network of packet transfer devices. Every packet of information carries all the necessary control information to "connect" the originating device to the destination device using only the needed resources. The convergence of transport and access networks, increased resource utilization through packet switching, and favorable regulatory conditions have propelled IP telephony to the top of many competitive service providers' network agenda. While technology cost reduction is still important, the competitive service providers have learned to focus on service differentiation in order to sustain competitive advantage. Service differentiation occurs at a high level than network interconnection. It requires transparent bridging of the media, control and application layers between IN (Intelligent Network) and IP networks.

SUMMARY OF THE INVENTION

Accordingly, a need has arisen for a device that is able to seamlessly internetwork networks using different signaling and transport protocols. The softswitch of the present invention allows service providers to interconnect intelligent control and signaling systems between networks, so that new flexible, open services can be created, and integrated to generate new revenue sources.

In an embodiment of the present invention, a softswitch interconnecting networks of different transport protocols is provided. The softswitch includes a signaling agent coupled to the networks and operable to receive incoming signaling messages, translate the incoming signaling messages to a call model event, and route the call model event. The softswitch further includes a call agent in communication with the signaling agent and operable to receive the call model event, request outgoing resources for establishing data sessions, generate outgoing signaling messages, and send the outgoing signaling messages to the signaling agent. The signaling agent then terminates the data sessions on the requested outgoing resources.

In another embodiment of the present invention, a method of internetworking between networks of different transport protocols is provided. The method includes the steps of receiving signaling messages from a signaling network, translating the signaling messages into call events, and processing the call events. The method further includes requesting outgoing resources for establishing data sessions with devices coupled to a transport network, and terminating the data sessions on the requested outgoing resources.

In yet another embodiment of the present invention, a softswitch interconnecting networks of different transport and signaling protocols is provided. The softswitch includes a signaling agent coupled to the networks and operable to receive incoming signaling messages, translate the incoming signaling messages to a call event, and route the call event. The softswitch further includes a call agent in communication with the signaling agent and operable to receive the call event, verify the validity of incoming circuits of inbound calls, and generate a request for an outgoing resources for establishing data sessions. The softswitch also includes a network directory server in communication with the call agent and operable to receive the request for an outgoing resource, and provide information on the outgoing resource. The softswitch also includes a network gateway agent operable to receive a request to establish a data session on the selected outgoing resource, and set up an open session. The call agent is operable to terminate the data sessions on the requested outgoing resources, and generate a call detail record in response to disconnecting the data session.

BRIEF DESCRIPTION OF THE DRAWINGS

For a better understanding of the present invention, reference may be made to the accompanying drawings, in which.

DETAILED DESCRIPTION OF THE INVENTION

Figure 1:
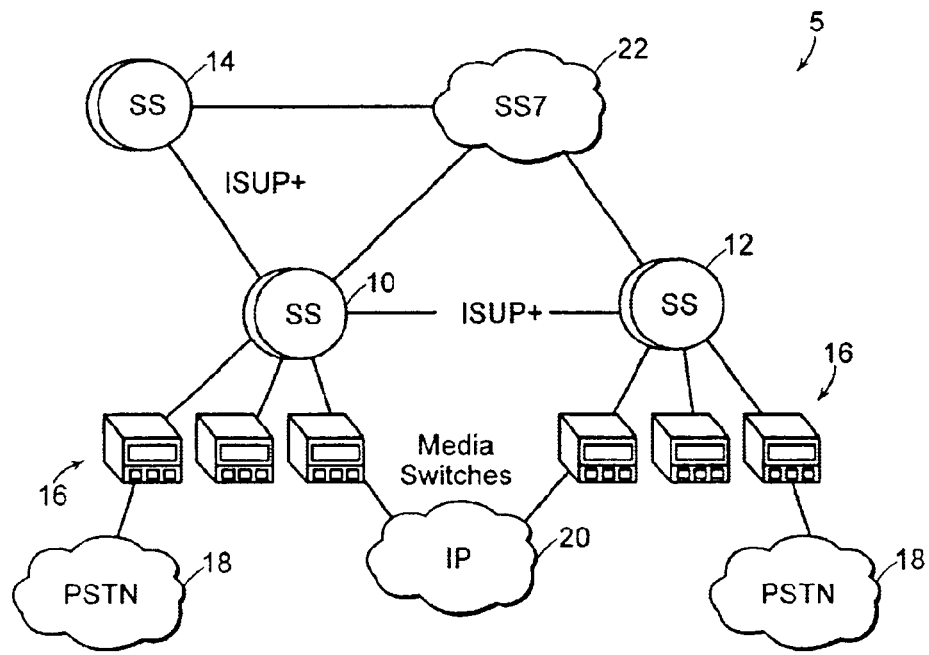
FIG. 1 is a block diagram of a network topology based on the softswitch of the present invention.

FIG. 1 is a block diagram of a network topology 5 based on the softswitch of the present invention. Network topology 5 includes several interconnected softswitches (SS) 10, 12 and 14, each of which interconnect several media switches 16. The communication between the softswitches may be through the use of ISUP+ (ISDN user part+), which is based on International Telecommunications Union (ITU) broadband ISDN user part (B-ISUP). Media switches 16 interconnect various network media, such as PSTN (public switched telephone network) 18, IP (Internet Protocol) 20, MGCP, and others thus enabling the transport of calls or sessions across different network domains. For example, a call may originate on a PSTN 18 and be routed to a media switch 16 via the SS7 network. Depending on the session transaction, features may be added to the call session, such as bandwidth allocation (compression) or security (encryption), or virtual private network (authentication). The call or session may then be transported across another media network, such as an IP network, for completion on another media switch across town, across the country, or in another part of the world. The softswitch configuration controls the end-to-end transport of the call through integration of the network intelligence between the two media switches. The call session may then be converted back to a PSTN network for termination at a remote branch office. In this way, service portability is enabled. The services can be distributed to any device anywhere in the network over different media without the limitations of a CLASS-based network topology.

Figure 2:
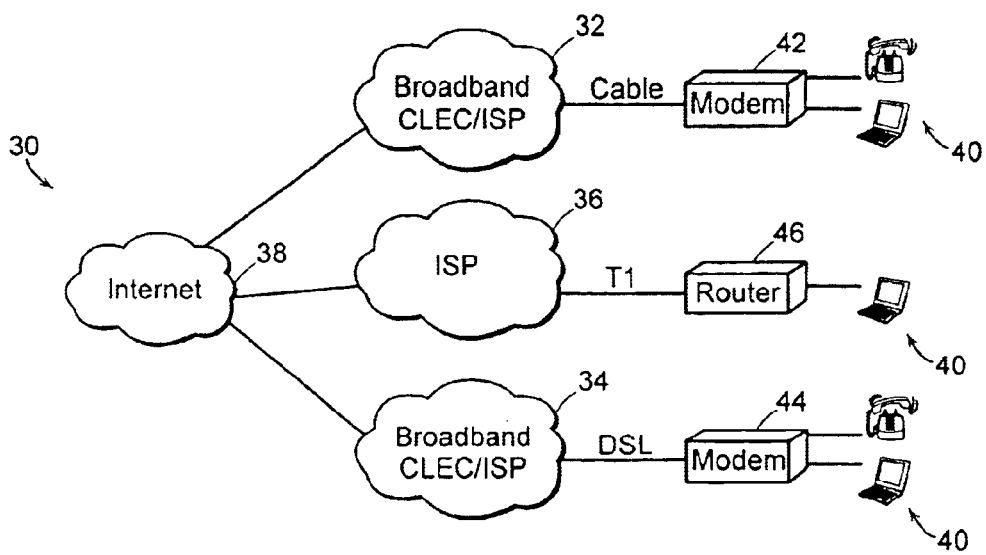
FIG. 2 is a block diagram illustrating the present Internet telephony network architecture.

FIG. 2 is a block diagram illustrating the present Internet telephony network architecture 30. In today's Internet telephony network 30, broadband Internet-service providers 32 and 34, and Internet service providers (ISP) 36 installed high bandwidth access pipes from the Internet 38 to the users 40. Today's technology utilizes a number of different transport mechanisms to accomplish this link to the Internet, including cable modem 42, DSL modem 44, router 46, and dial-up access (not explicitly shown). These modems translate Internet traffic between the desktop (TCP/IP port) and the transport medium (cable, DSL, T1).

The telephony interfaces on the modems are supported by the ISP with interconnect to the PSTN. As a result, these ISPs are known as competitive local exchange carriers or CLECs. The only entity that can provide telephony services to users 40 are the ISP/CLEC provider that installed and own the modems. The users are charged separated for each provided service. For example, Internet TCP/IP access is charged separately from telephony services, which is also charged separately from cable video services.

The users in this scenario are also forced to make a technology decision for his telephony services. For example, if a user subscribes to a cable ISP, he cannot take his telephony service equipment and change over to a DSL ISP provider. The current technology does not provide the user to have geographic portability or fully take advantage of the flexibility of the Internet.

Figure 3:
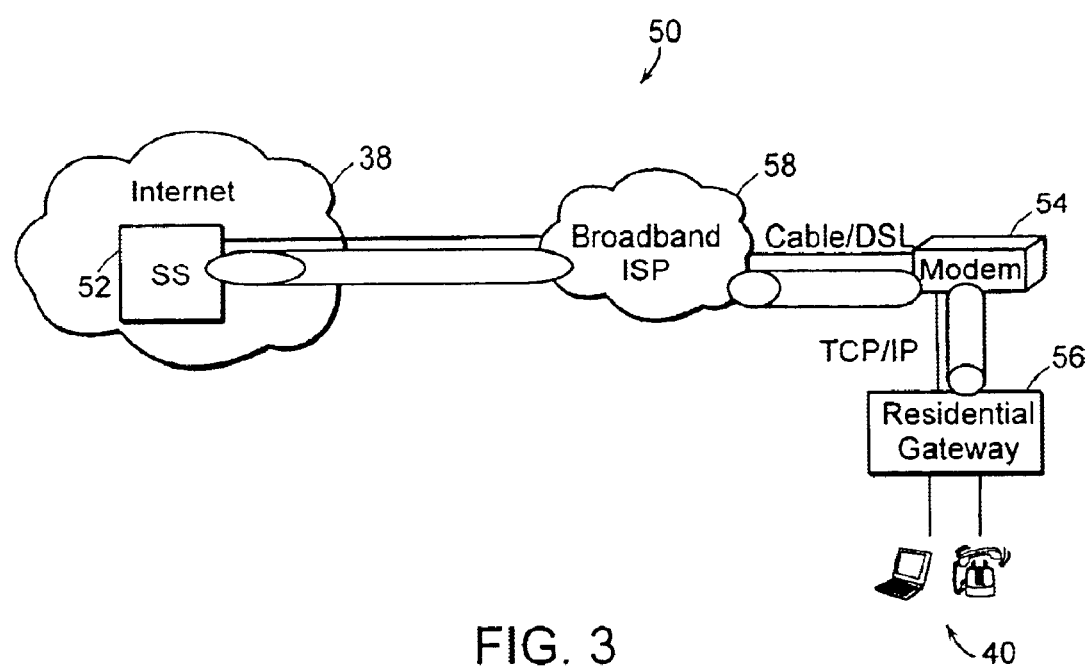
FIG. 3 is a block diagram of the Internet telephony network architecture using the softswitch of the present invention.

FIG. 3 is a block diagram of the Internet telephony network architecture 50 using an Internet-based softswitch 52 of the present invention. Softswitch 52 functions as an Internet central office that provide traditional central office functions and capabilities to the Internet user community. Therefore, any IP-enabled user 40 has access to telephony services, without regard to the underlying transport technology. Users 40 are coupled to the Internet central office via a residential service gateway 56. Residential service gateway 56 provides proxy server, TCP/IP hub, firewall, residential gateway, and residential service client software functionality. The proxy server function allows the user to only require one IP address from the ISP for multiple devices and improves performance for a group of users. The TCP/IP hub function allows for connectivity from one to multiple TCP/IP devices. The firewall function protects the customer devices from fraudulent access originating in the Internet. The residential gateway functions convert the analog telephony services from the user into TCP/IP for transport through the Internet. Additionally, the Internet central office is operable to control and communicate with residential service gateway client software 56 for call state control. The residential service client software is a companion client application to the Internet central office. This client allows the user (telephony subscriber) to solicit or initiate service from the Internet central office. This client provides a secure, encrypted dialog between the Internet central office and the user's client for call control (registration, addressing and supervision). Another feature of the residential service client software is that user's service profiles may be uploaded or downloaded to a database in the residential service gateway through a local area network (LAN), serial port, smart card, or an infra-red interface into a third party application and device. This functionality allows the user to be fully mobile by connecting to any residential service gateway, download their profile into the residential service gateway, and personalize it.

Residential service gateway 56 may be a stand-alone hardware/software combination equipment or be in the form of a software application running on a user's personal computer. As a software application, it has the added advantage of being downloadable and run locally on the user's computers.

The Internet central office implemented with softswitch 52 allows the establishment of CLECs on the Internet. Users who own residential service gateway equipment or software can subscribe to telephony services directly from the Internet central office-enabled CLEC. The customer's ISP transports this service as though it were normal IP traffic. The Internet central office and residential service gateway interoperate at the IP level and are therefore compatible with any IP transport medium. The Internet central office can switch telephony traffic from one Internet-based residential service gateway to another, or connect calls between the PSTN and an Internet-based residential service gateway customer. A subscriber may relocate his/her residential service gateway, or transfer his/her profile to another geographical location, and his/her telephone number and services will follow to any location in the world without the need for traditional number portability systems. Internet central office service is completely (carrier, service, and geographic) portable.

Upon initialization, residential service gateway 56 is assigned an IP address from the ISP. Residential service gateway 56 then automatically locates the Internet central office on the Internet. Residential service gateway 56 then registers with an existing account or is directed to an automated provisioning system to establish new services. New service provisioning may allow the user to port his/her existing telephone number, or select an area code for a serving city where he/she desires service to be established.

Station identifiers or telephone numbers are a function of the Internet central office's point of presence. For example, if an Internet central office were interconnected to city A PSTN, it may offer city A telephone numbers to its subscribers regardless of the geographical location of the customer's residential service gateway. Calls that originate and terminate to and from Internet central offices can be considered within the network and thus know no limit to the calling area. Such a configuration would motivate flat rate pricing.

It may be seen that the residential service gateway includes network registration, call control/supervision, subscriber services, client security, and user profile database functionalities.

Internet central office providers may negotiate first tier interconnect agreements with the broadband ISPs to provide a higher quality of service. An Internet central office may also interconnect to another Internet central office using a managed IP network to maintain a high quality of service.

Therefore, by adopting the network topology shown in FIG. 3, a number of advantages are obtained. The Internet telephony market is opened to competition and allows for cost reduction of telephony services. The Internet central office and residential service gateway interoperate using any broadband Internet technology so that service is portable from one transport to another. The user's telephone service becomes geographically and service portable to any location. The Internet central office allows existing CLECs to extend the reach of their telephony network into the broadband user's premise without investment in broadband technology. This technology also eliminates the need for unbundling the broadband ISP to telephony carriers. Flat rate calling service plans become available for calls that stay within the Internet central office network. Furthermore, the Internet graphical user interfaces can be leveraged to automatically provision services.

Figure 4:
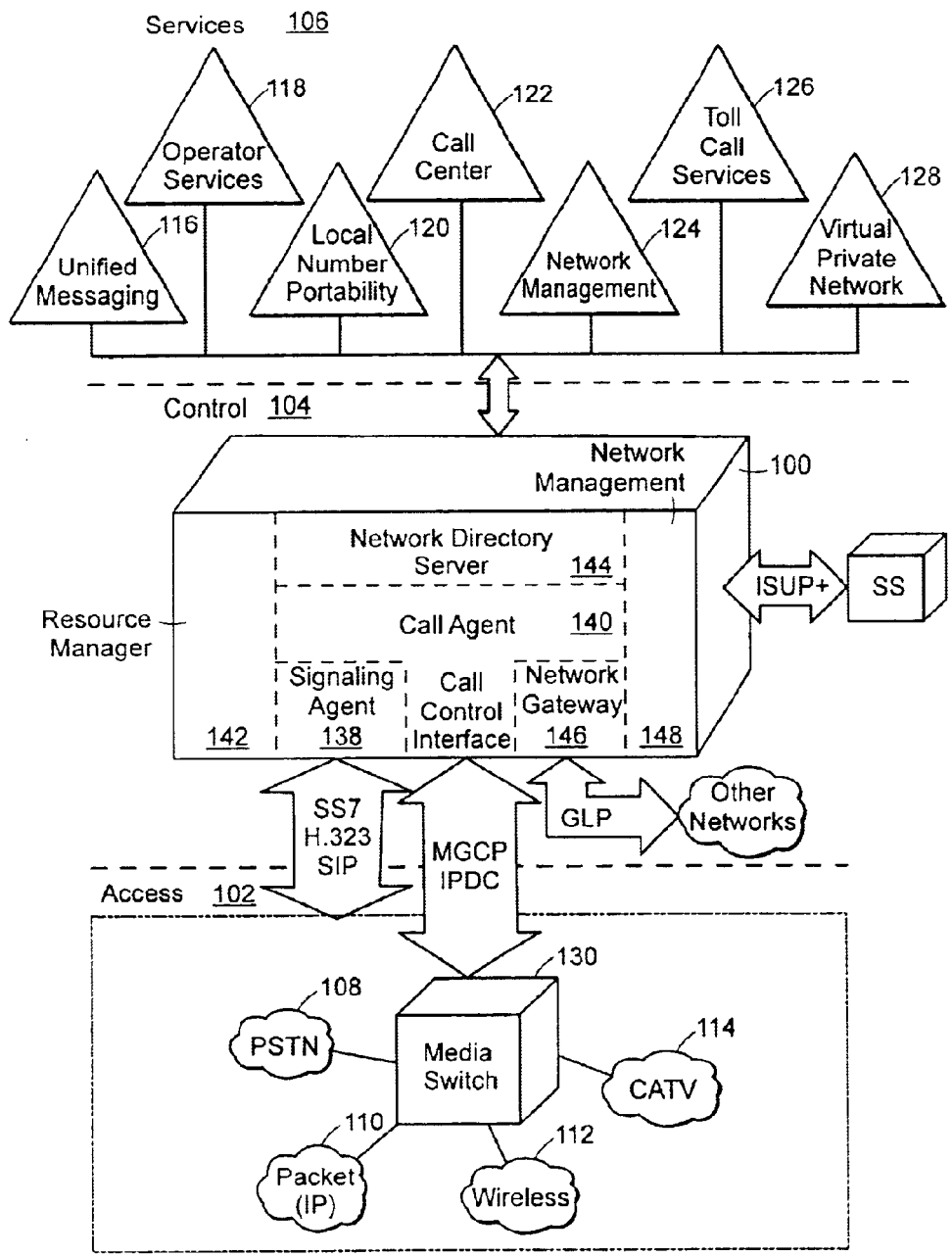
FIG. 4 is a simplified top-level block diagram of an embodiment of the softswitch constructed according to the teaching of the present invention.

FIG. 4 is a simplified top-level block diagram of an embodiment of the softswitch 100 constructed according to the teaching of the present invention. Softswitch 100 is based on the session layer of the OSI model. The session layer is where the network intelligence resides, not at the transport or application layers. The network structure for telecommunications is evolving to have three distinct functional layers: access 102, control 104, and services 106. Access layer 102 is responsible for media transport of calls and sessions, and includes PSTN, packet (IP) network 110, wireless 112, CATV (community antenna television) 114, etc. Control layer 104 is responsible for controlling the elements of the access level and operating in concert with the service level as calls or sessions require interaction with services available in the network. Services layer 106 is responsible for defining the services through databases and service logic. Examples of services are unified messaging 116, operator services 118, local number portability 120, call center 122, network management 124, toll call services 126, virtual private network (VPN) 128, specialized routing (time-of-day, calling party area, etc.), unified messaging, etc. It may be seen that softswitch 100 resides in control layer 104.

Softswitch 100 is preferably built on open protocols to set-up and control media sessions, i.e. any combination of voice, data and video flows. Some open protocols used by the media switches 130 are IPDC (IP device control protocol), MGCP (media gateway control protocol), and SGCP (simple gateway control protocol). Softswitch 100 includes six main functional components: signaling agent 108, call agent 110, resource manager 112, network directory server 114, network gateway 116, and network management 118.

Figure 5:
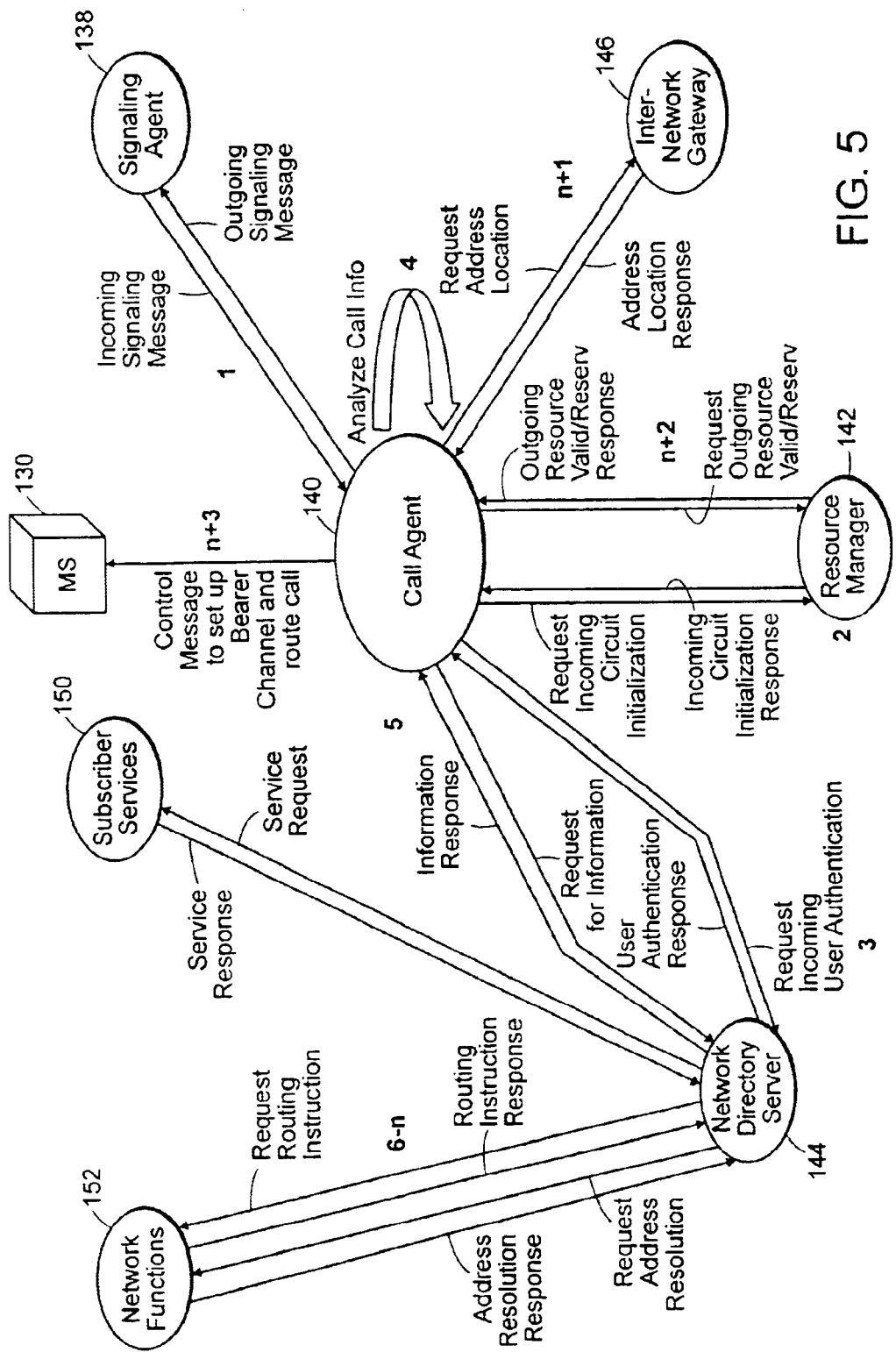
FIG. 5 is a more detailed block diagram of an embodiment of the softswitch constructed according to the teaching of the present invention.

With reference to FIG. 5, signaling agent 138 communicates with call agent 140 and access network 102, such as media switch 130, SS7 network, and SIP (session initiation protocol) end users. Signaling agent 138 translates incoming signaling messages to the appropriate call model event to be sent to call agent 140. The role of signaling agent 138 is to receive any type of access protocol, communicate with call agent 140, and to terminate the call to the appropriate network using the applicable protocol as instructed by call agent 140. For example, signaling agent 138 may receive an SS7 IAM and be able to terminate the call to an IP network user. To call agent 140, events from signaling agent 138 appear as if it is just another client/server that is capable of originating and terminating sessions.

Signaling agent 138 is operable to support standard MTP and physical level interfaces as required by the networks. The processing of the SS7/C7 interfaces are handled within signaling agent 138. The session or call processing protocol on signaling agent 138 is session initiation protocol (SIP). By utilizing a native packet-switch control protocol out of the edge element, signaling agent 138 are able to represent the control of the media switch packet capabilities in native form. Thus, capabilities and interaction of call agent 140 and signaling agent 138 are not constrained to a legacy interface as the packet-switched network and services continue to evolve. A number of existing IP telephony products are controlled or interoperate with the H.323 protocol. The softswitch provides interoperability between H.323 and SIP. H.323 can remain configured in access networks, grouping together several devices into domains. The softswitch adds the extensibility found in SIP protocols to provide simplified interaction with the call session engine, which in turn interacts with the policy/directory server and feature application servers. In this way, investments in H.323 are protected without compromising future development brought about by new service applications. Multi-network datagram transmission protocol (MDTP) is an application level protocol designed to provide a fault-tolerant, real-time reliable data transfer between endpoints communicating over an IP network. It is used to provide call control and signaling for Internet telephony. It is scalable to support different signaling transport requirements based on the different interfaces to the telephony network.

Call agent 140 is responsible for managing the end-to-end control of the sessions or calls between packet-switched elements. As a central element in the architecture, call agent 140 is a focal point of access to intelligent services as required by the sessions under its control. Billing data consolidation of services provided and entities involved in the call will be performed in call agent 140. Interworking and translation for the SS7/C7 events to SIP and the implemented gateway control protocol will be performed with the relevant state data maintained in call agent 140. The media switch chosen for any particular implementation of the softswitch is dependent upon the transport requirements of the service provider's network. The control of the media switch has the following minimum criteria for interworking with the softswitch: open gateway control protocol of MGCP, registration of configured ports through the gateway control protocol, SNMP (simple network management protocol) trap support, web-based configuration mechanism, minimum of E1/T1 support on circuit-switched connectivity. The above attributes allows signaling agent 138 the capability to manage the circuit-switched ports on one or more media switches. The limit of the ports managed will depend on the density of ports in each media switch and the hardware configuration of the signaling agent. The packet-switched interface of the media switch is directed by the gateway control protocol. This control allows the RTP or other streams to be connected between the media gateway and the other media devices as directed by the signaling agent.

The IP device control (IPDC) protocol is used between the media gateway controller call agent 140 and the media gateway. It is used to provide connection control, media control, and signaling transport. In order to support different service provider media gateways, the softswitch supports MGCP and IPDC to communicate and control the media gateway. Call agent 140 provides the raw data to the service providers down stream billing systems for call detail records (CDR), and other billing functions. The raw data can be customized per interface.

The main responsibility of resource manager 142 is to validate the incoming circuit, and to provide resource availability information for the outgoing call from the media switch. Resource manager 142 is responsible for maintaining circuit state and relative information, for all circuit-switched entities on the media switches. In addition, resource manager 142 is responsible for managing virtual ports (DSP, echo cancellers) on the media switch, depending on the media switch implementation. Also, resource manager 142 is operable to determine aggregated bandwidth allocation on the media switch.

Network directory server 144 is responsible for managing user profiles, such as access authorization, call barring, dial plan, etc. and providing routing instruction for local and external (local number portability, 1-800) calls. Network directory server 144 is also operable to provide address resolution and translation, and accessing subscriber services (special tones and treatments) by sending requests to network functions element 152 and subscriber services element 150. Network directory server 144 also handles scripts by accepting, acting, and distribution to correct destinations. Network directory server 144 is accessed by call agent 140 to receive routing instructions. Network directory server 144 may reside on the same platform as call agent 140 or may be distributed. Network directory server 144 may also provide enhanced routing function, such as time-of-day routing, percent allocation routing, dial plan, route choice, etc.

Network gateway 146 is responsible for interconnecting the softswitch network to an external network. Call agent 140 accesses network gateway 146 to determine a location of a user and he/her privileges in order to route the call to the external network. For example, if a user is not within the softswitch domain, call agent 140 is prompted by network directory servers 144 to request instructions from network gateway 146. At this point, call agent 140 requests instructions on where to route the call, different rate structures associated with the call, and determine if the external network is willing to accept the call. If all conditions are satisfied the external network gateway will provide network gateway 146 with routing instructions.

Network management 148 is responsible for provisioning, monitoring, alarm generation, performance and trouble shooting management, reporting, system maintenance and administration, configuration management. The various control elements reside in an IP network. They utilize SNMP and remote monitoring (RMON) agents to collect, store, trap, and monitor data/trends on network utilization, performance, availability, etc. This information is combined with configuration attributes from each device into a user-friendly, browser-enabled network management interface, using HTML. In this way, users have control, administrative, and monitoring capability from anywhere in the network. This format allows for integration with other web-enabled network management systems and provides the ability to push service administration to customers without compromising operational integrity of the production network.

Figure 6:
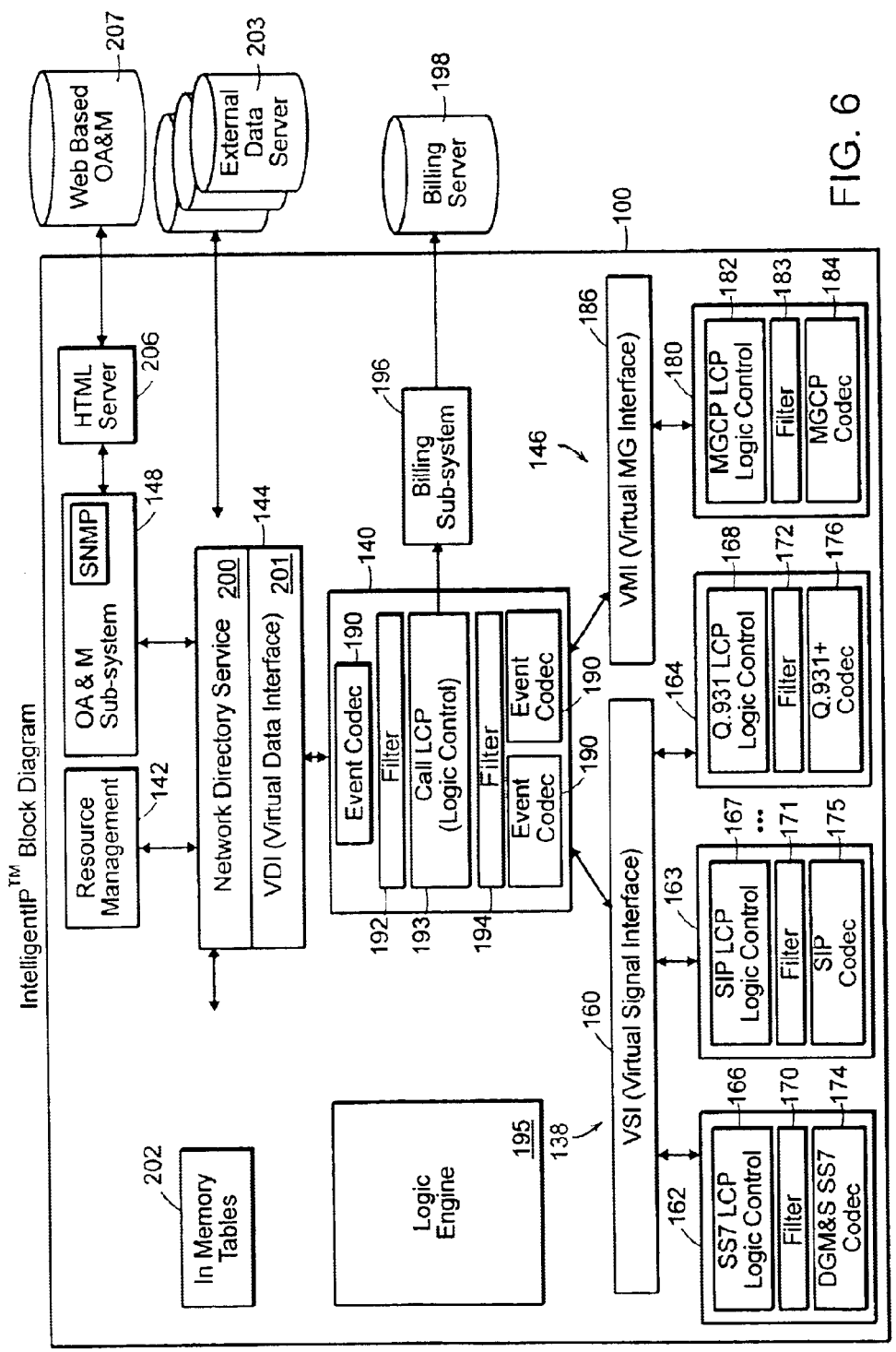
FIG. 6 is a simplified internal call flow diagram of an embodiment of the softswitch constructed according to the teaching of the present invention.

FIG. 6 is a more detailed block diagram of an embodiment of the softswitch 100 constructed according to the teaching of the present invention. Signaling agent 138 of softswitch 100 includes a virtual signal interface (VSI) 160, which provides an interface to call agent 140. Signaling agent 138 includes a number of signaling agents 162–164 operable to interface with SS7 interface, SIP devices or interface, H.323 devices or interface, Q.931 interfaces and devices, and others. Each signaling agent includes a respective logic control 166–168 executing logic control program, filter processor 170–172, and codecs (coders/decoders) 174–176. Codecs are specialized communication modules. Network gateway 146 includes gateway agents 180 for interfacing with MGCP media gateway switch, IPDC media gateway switch, etc. Each gateway agent 180 each also includes a logic control 182 executing a logic control program, a filter processor 183, and a codec 184. Network gateway 146 further includes a virtual media gateway interface (VMI) 186 for interfacing with call agent 140.

Call agent 140 includes event codecs 190 for interfacing with network directory server 144, signaling agent 138, and network gateway 146. Call agent further includes a logic control 193 executing call logic control programs, and filters 192 and 194. Logic controls 166–168 and 182 and call logic control 193 make up logic engine 195. Logic engine 195 is a protocol-independent, data-configurable, multi-threaded state machine processor. The details of logic engine 195 are set forth below with reference to FIGS. 14 and 15. Call agent 140 also communicates with a billing sub-system 196, which stores CDRs and other billing information in a billing server 198. Network directory server 144 includes a network directory service 200 and a virtual data interface (VDI) 201. Virtual data interface 201 interfaces with call agent 140. Network directory service 200 accesses in-memory tables 202, which store user profiles, routing instructions, addresses, and subscriber services. Network directory service 200 further accesses external data servers 203. Network directory service 200 also communicates with resource manager 142 and network management 148. Network management 148 includes OA&M (operations, administration and maintenance) sub-system, which communicates with an HTML server 206 and a web-based OA&M database 207.

It may be seen that call agent 140 interfaces with virtual signal interface 160, virtual media gateway interface 186, and virtual data interface 201. Signaling events are received through VSI 160 and the specific protocol events are normalized. The key to routing messages between logic control programs is the message type (call set up, disconnect, etc.) and subsystem type (SS7, SIP). The normalized signaling event is sent to call agent 140 for processing. Assuming proper message formatting, a route is selected, the media gateway agent is contacted, the call is terminated through the media gateway agent and the call control processing is complete until one of the calling parties terminates the call. During the course of processing the event the message goes through the following stages:

1. A normalized message is received from the VSI.
2. The data contained in the message goes through basic validation to confirm that the contents have not been modified or lost. The call is abandoned if the data is invalid.
3. The inbound circuit is queried, through the VDI, to confirm the call is being processed from a circuit in a valid state. This is to prevent processing a call from a circuit that has been administratively locked or through fault management that has been disabled.
4. Query the VDI to select a route for the call based on the called number, which may be a SS7 circuit or an IP address for SIP.
5. For a successful route, contact the media gateway agent and open a session. Send a CallSetup message to the VSI. If the route failed, play an announcement and abandon the call.
6. Upon receipt of the alert message from the VSI, the media gateway agent is updated to add the termination leg to the existing call session. The alert message is sent to the VSI.
7. Upon receipt of the answer message from the VSI, the media gateway agent is updated to cut the voice path between the originator and the terminator for the existing call session. The answer message is sent to the VSI. The call is now setup and waiting for one of the calling parties to disconnect.
8. Received a message that one of the calling parties disconnected. Tell the VDI to release the resource, cut a billing record.
9. When all the calling parties have disconnected, a final billing record is cut. The call model logic control program exits.

Figure 7:
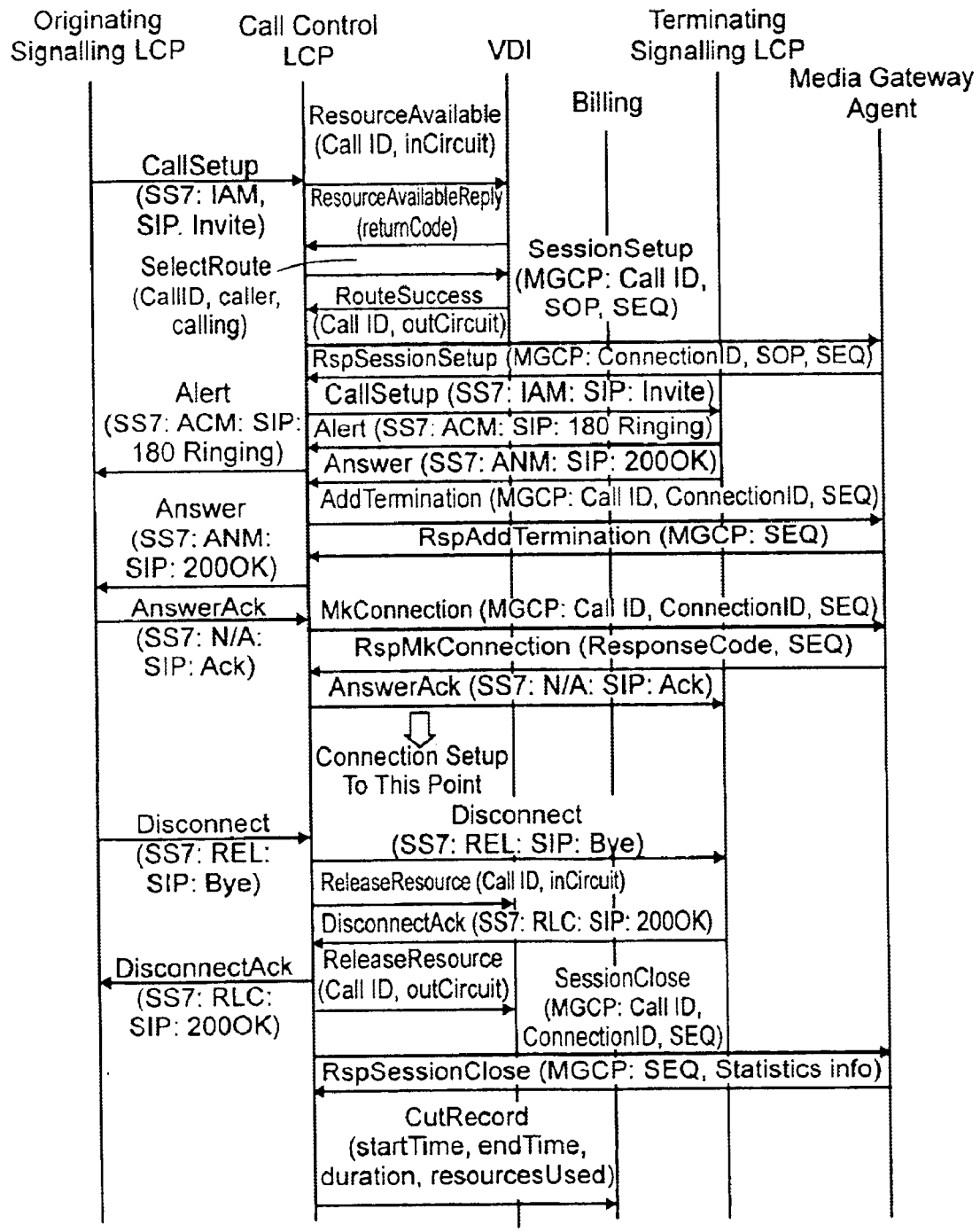
FIGS. 7–13 are call flow diagrams illustrating the operations of the call logic control subsystem of the present invention.
Figure 8:
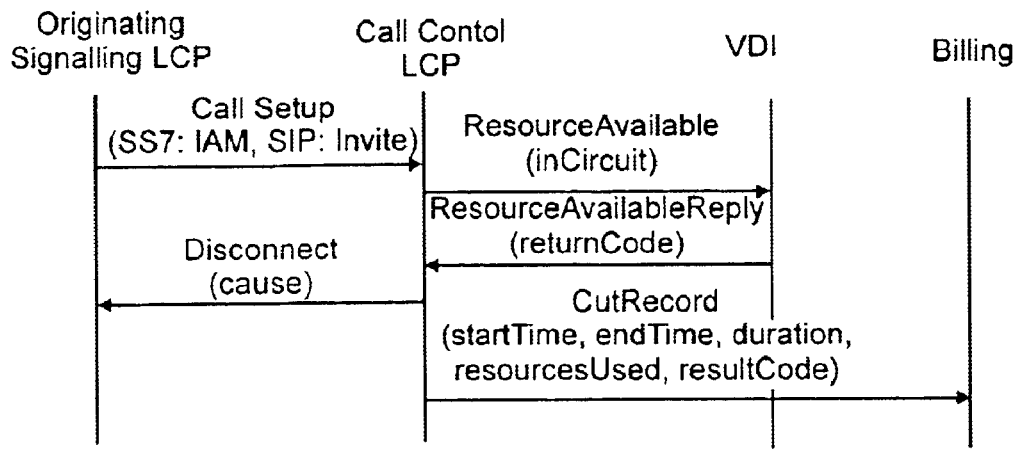
Figure 9:
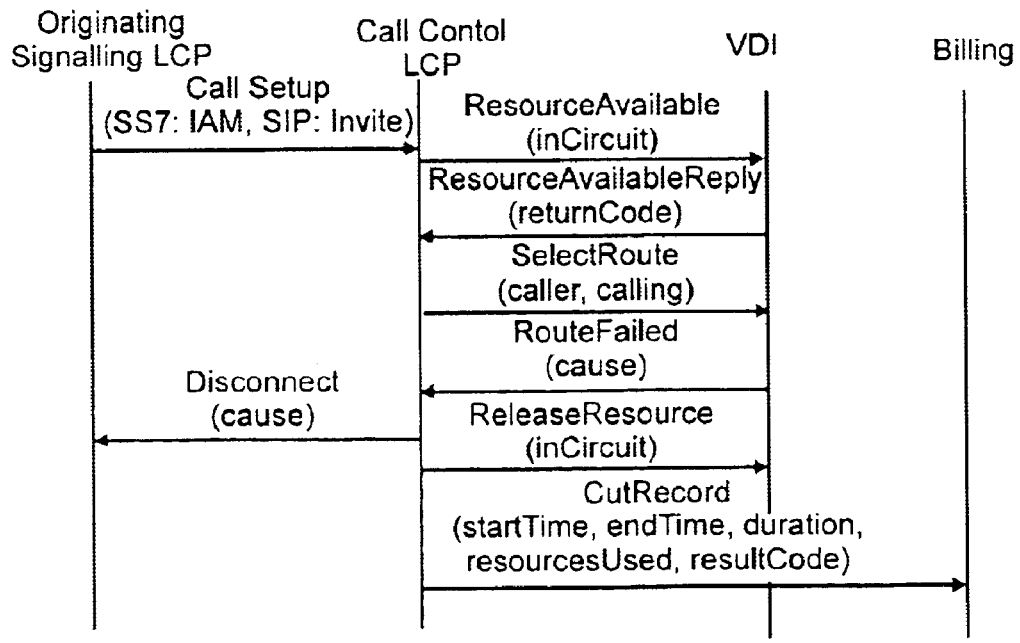
Figure 10:
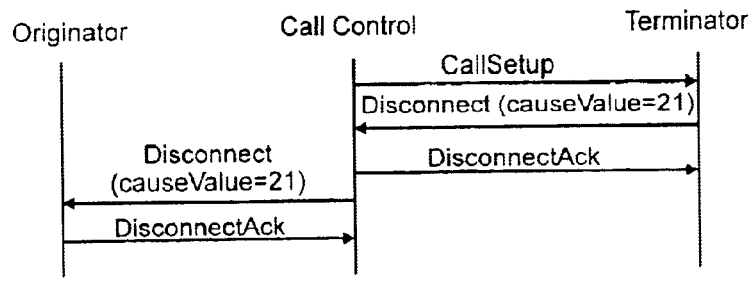
Figure 11:
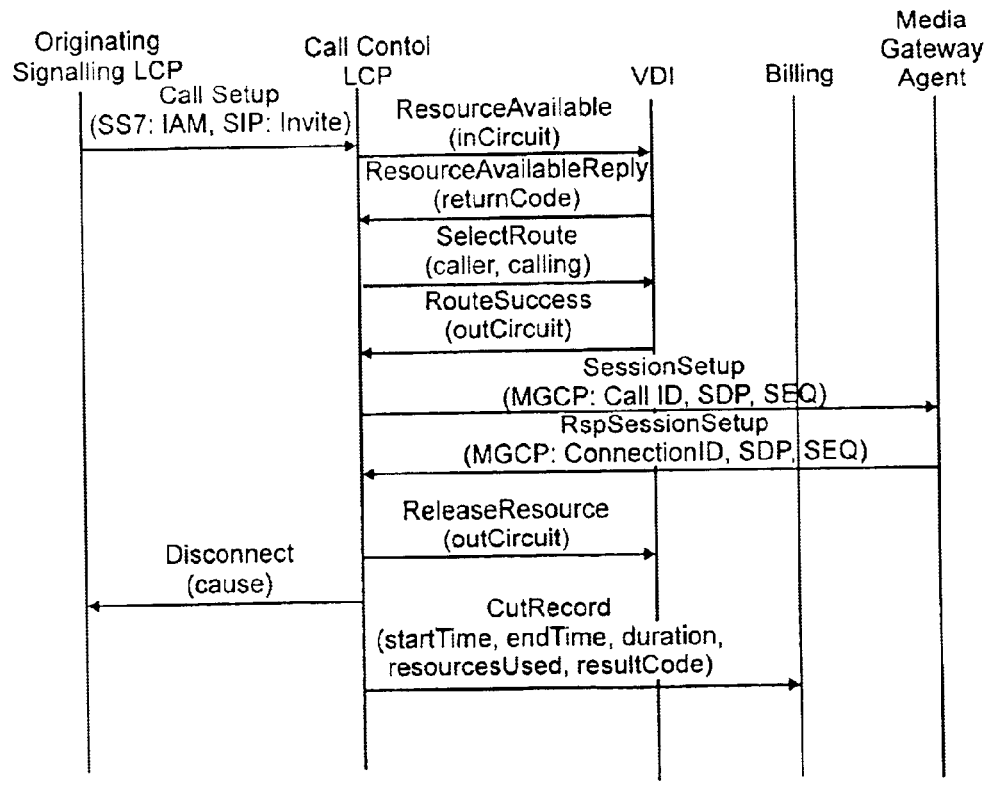
Figure 12:
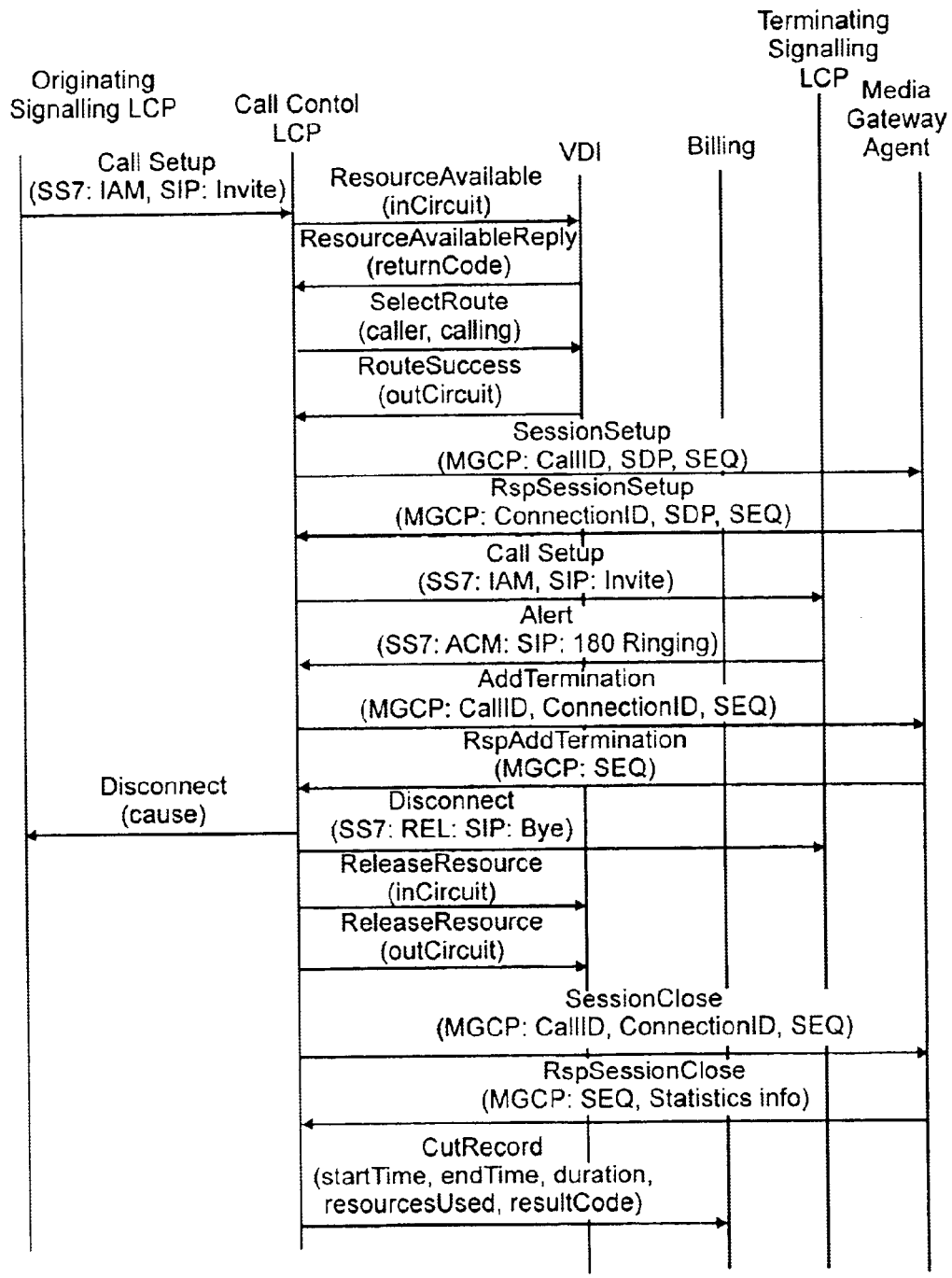
Figure 13:
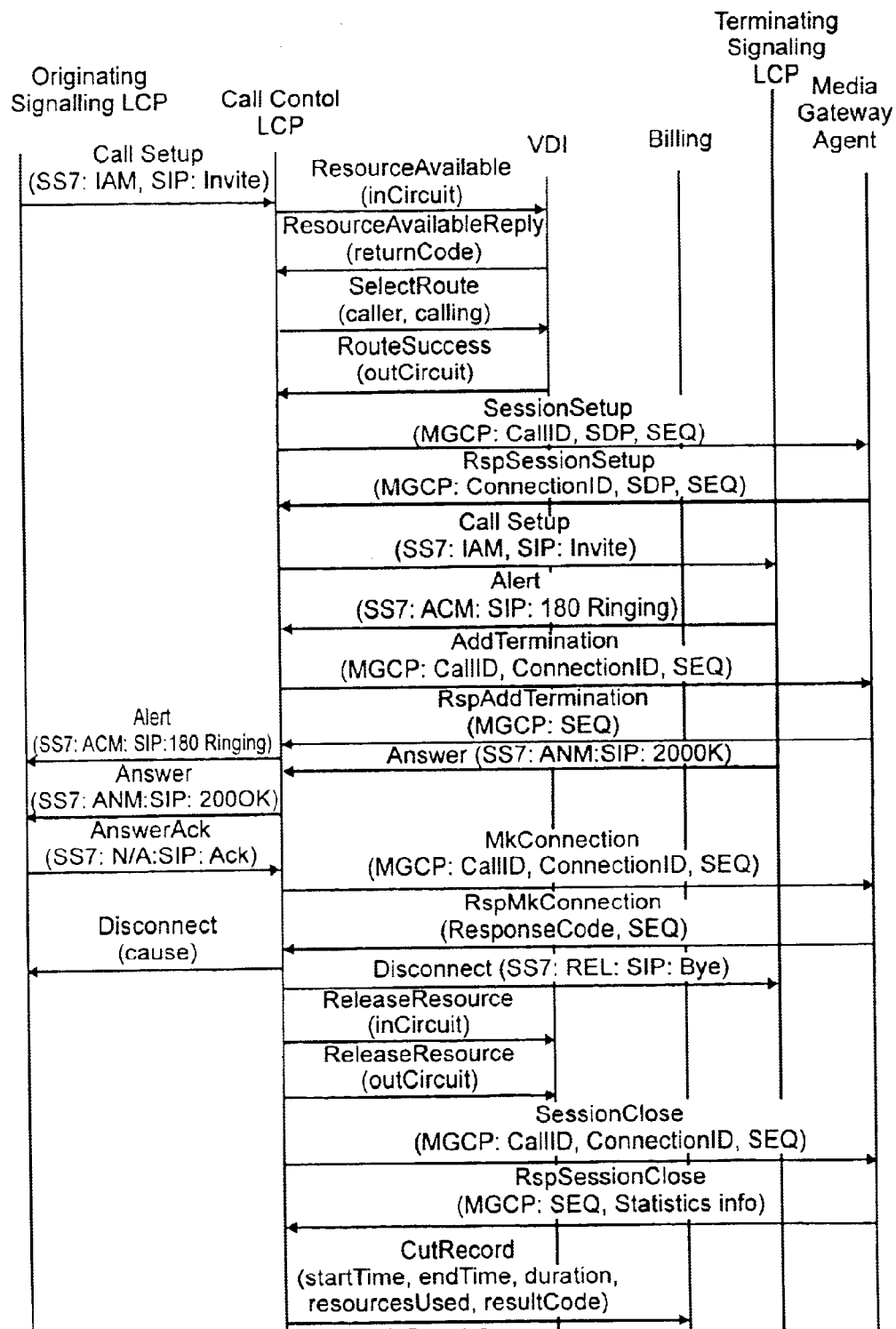

FIGS. 7–13 are exemplary detailed call flow diagrams illustrating the call logic control subsystem of the present invention. FIG. 7 is a call flow diagram of a normal call processing. FIG. 8 shows the call flow in which the in bound resource/circuit is in an invalid state to process the call. The call VSI is notified that the call has been abandoned. A billing record is produced to indicate that an error occurred. FIG. 9 is a call flow diagram of a route request that failed. The failure cause code returned from the VDI is mapped to a normalized cause code that VSI and call control agree upon. FIG. 10 is a call flow diagram illustrating the call flow in which the terminating side is busy. FIG. 11 is a call flow diagram showing the media gateway agent returning a failure code for the session setup request. An announcement is played to the caller and the call is abandoned. FIG. 12 is a call flow diagram showing the media gateway returning a failure code for the add termination request. An announcement is played to the caller and the call is abandoned. FIG. 13 is a call flow diagram showing the media gateway returning a failure code for the make connection request. The originator and terminator are played an announcement and the call is abandoned.

Figure 14:
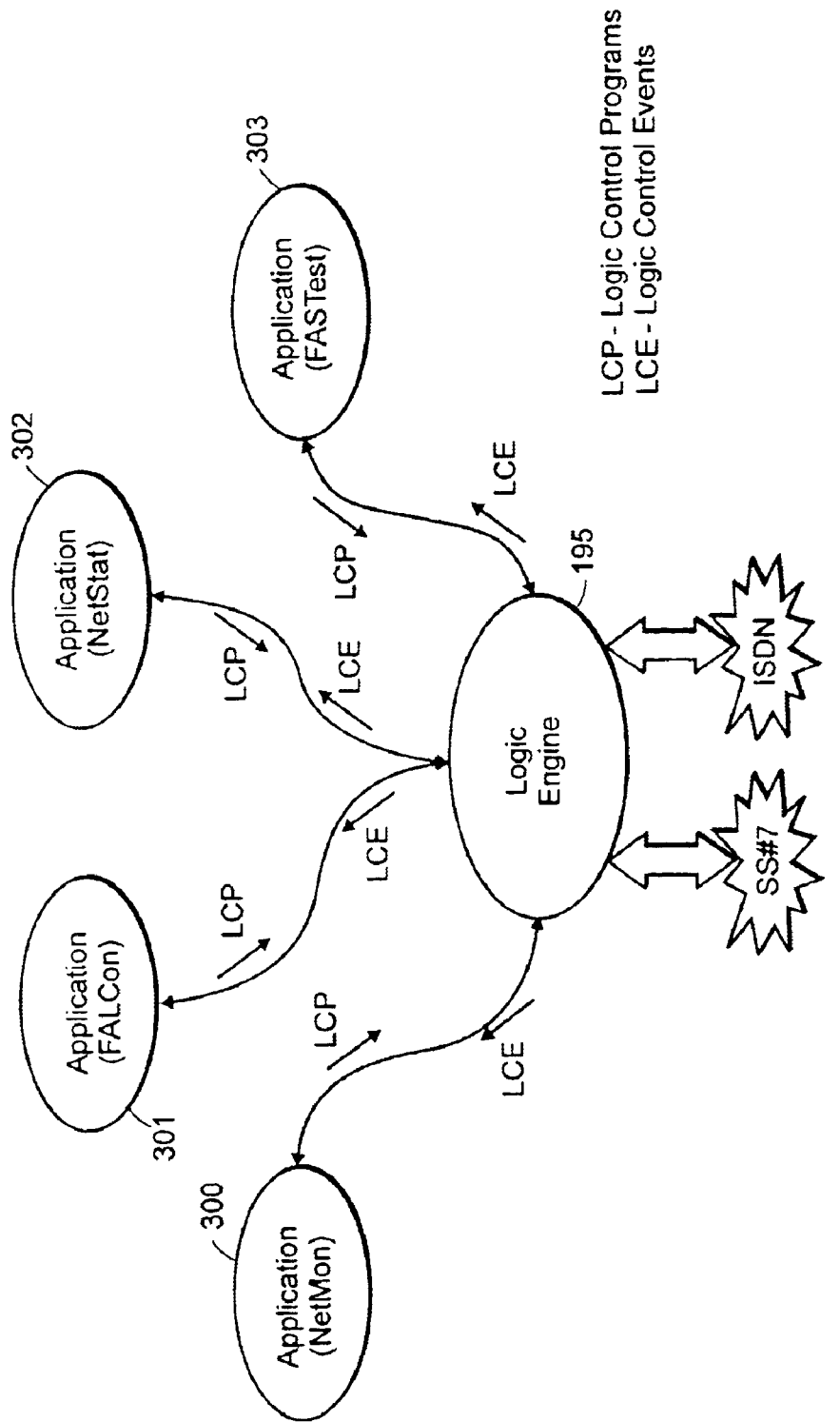
FIG. 14 is a logic diagram of the operations of a protocol-independent logic engine for processing call events.

FIG. 14 is a logic diagram of logic engine 195 according to the teachings of the present invention. Logic engine 195 is operable to allow applications 300–303 to download and retrieve the status of logic control programs. Logic engine 195 is a configurable state machine processor that is responsible for carrying out the logic control program. This includes sending and receiving messages on the appropriate communication links, generating events for the application, maintaining operating statistics on each logic control program, and communicating with other logic engines. Logic engine 195 is operable to communicate with many specialized communicator modules or codecs (162–164, 180). These codecs are responsible for handling the formatting and parsing of the messages for the protocol each specializes as well as dealing with the transmission to and reception of the messages from the outside world. Furthermore, a maverick codec may be employed which is responsible for performing tasks not associated with a standard protocol, such as billing, statistics, or provisioning. Each logic engine component (logic controls, codec, filters) is running in a separate thread. It is therefore possible to configure what threads are in the logic engine at run time so that functionality in the form of different codecs can be easily added.

Logic engine applications 300–303 are external processes that communicate with logic engine 195. Since a logic engine 195 has no built in algorithms for performing any specific process, it is applications 300–303 that supply application-specific functionality. The applications may establish and maintain a TCP/IP socket connection with the logic engine, generate appropriate logic control programs and downloading them to the logic engines, and monitoring event and statistic data.

Figure 15:
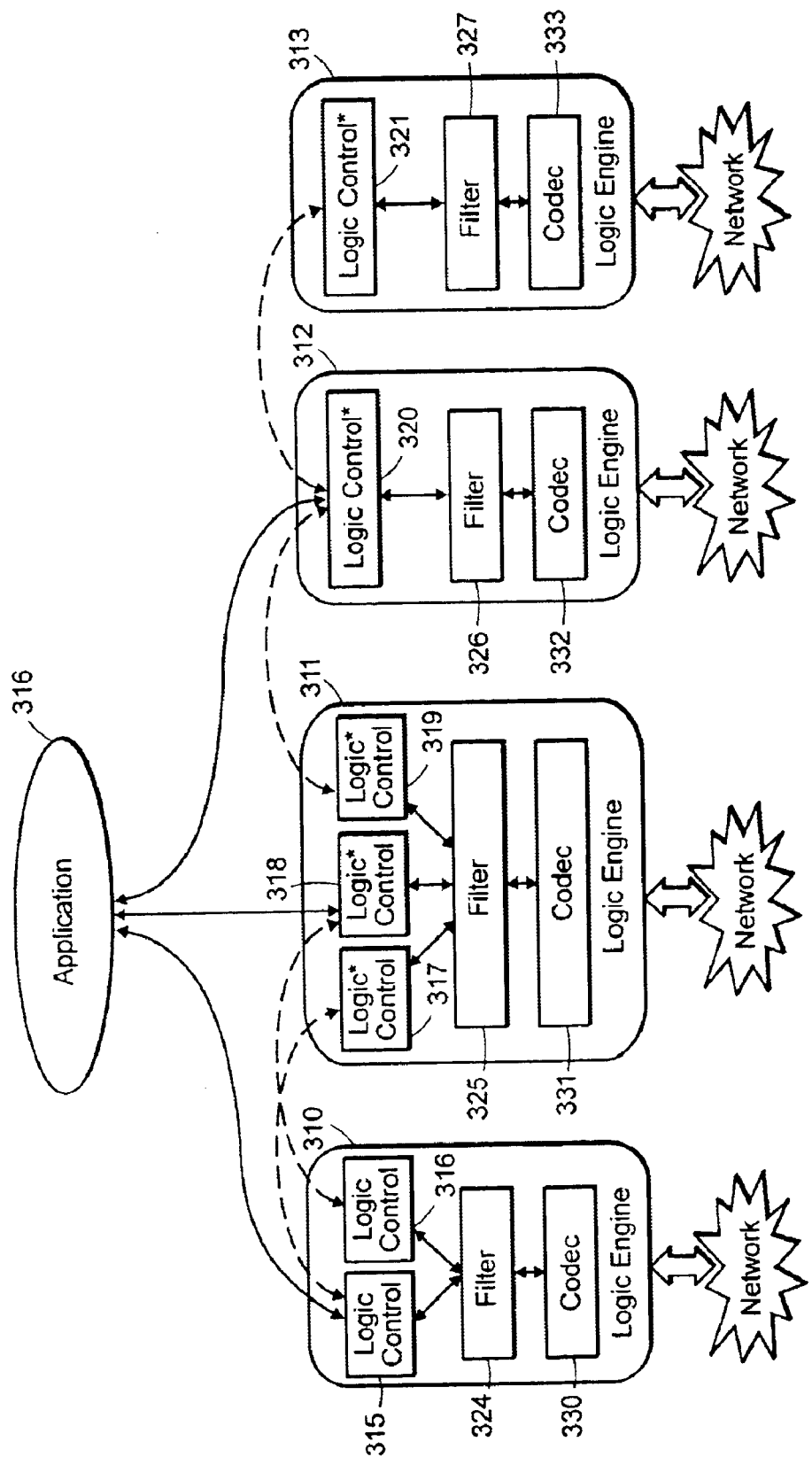
FIG. 15 is a more detailed logic diagram of the operations of the protocol-independent logic engine for processing call events.

Referring to FIG. 15, a block diagram of the basic architecture of a network of logic engines 310–313 is shown. It may be seen that one single application 316 can communicate with one or more logic engines 310–316 and the logic engines themselves can be grouped in a hierarchy. When the logic engines are grouped in a hierarchy, it uses pass-through logic controls to pass messages that are intended to one logic engine from another logic engine.

Logic controls 315–321 are the data-configurable generic state machine processors that execute logic control programs. A logic control program defines how the logic engine is to operate. A logic control program contains actions (i.e. send an event to the application, transmit a message, etc.), transitions (which define what to do given a certain external event, i.e. message received, timer timed out, etc.), and data (i.e. lists of phone numbers or circuits, application identification on connection, timer values, etc.). A logic control program is a series of data items or independent building blocks that define what a logic engine application is to perform, such as message definition, data items, when to send a message, etc. Logic engines 310–313 also includes filters 324–327 that filter and route messages that originate from codecs 330–333 destined for logic controls 315–321. The logic engine can be distributed over many links, in multiple locations, to accomplish the tasks needed for a given application. In this manner distributed links can be monitored for one (or more) application, without the application needing to distribute itself over the links.

After an application is initiated and connecting to the logic engine, the application identifies itself by sending an application item to the logic engine. The application item identifies the application and specifies how to handle any downloaded data in the event the application disconnects. The application item may be the only item in the packet sent to the logic engine. The logic engine then checks to determine whether the application is allowed to download data to the logic engine. This requires that the application's identifier in the application item is not currently in use and is valid.

The application downloads a logic control program or multiple logic control programs to the logic engine to accomplish its desired tasks. The download process occurs after the application has established a socket connection with the logic engine. The logic control program data are preferably sent to the logic engine in the following order so ID references can be resolved properly:

1. Network Item(s)
2. Debug Item(s)
3. Match Item(s)
4. Column Item(s)
5. Counter Item(s)
6. Timer Item(s)
7. Load Item(s)
8. Key Item(s)
9. Event Data Item(s)
10. Event Item(s)
11. Message Item(s)
12. Action Item(s)
13. Transition Item(s)
14. Logic Item(s)
15. Logic Control Program Item(s)
16. Download Complete Control Item All items in the download list are optional. If an application has already downloaded a complete set of logic control program data, only new or changed items need to be re-downloaded to the logic engine. If a logic control program does not use a certain item type, such as a column or counter, the downloaded data does not need to include any item of that type.

Control commands are used to instruct the logic engine what to do with the downloaded data. These commands will only make sense to the logic engine if all the logic control program data has been downloaded by the application. The start command is used to instruct the logic engine to start executing a given logic control program according to the load rate(s) specified in the logic control program. The stop command is used to instruct the logic engine to stop executing a given logic control program. When this happens, all currently executing instances of the logic control program will continue to execute until they have completed. No new instances of the logic control program will be allowed to start once this command has been received. The continue command is used to tell the logic engine to start running a given logic control program from the point at which it was stopped. In this case the logic engine will start running the logic control program at the point along the load curve at which it was stopped. The burst command is used to instruct the logic engine to start running several instances of a logic control program at once. If the burst value is set to zero, the burst value stored from the logic control program download item will be used. The statistic commands are used to instruct the logic engine what to do with the current statistical data. These commands should not be issued until all the logic control program data has been downloaded to the logic engine. With these commands the logic engine can start the statistical data reporting, stop the statistical data reporting, clear the statistical data, or set the reporting frequency of the logic engine.

When a logic control program has been defined to transition based on input from the application, the application must be certain to send this event at the appropriate time so the logic control program will transition to the next set of actions. This transition/event combination is mostly useful in a situation that requires user interaction and the logic control program is the only instance that is running. If more than one instance of the logic control program is running, the application must be certain to send the correct key data to the logic engine so the event is passed to the correct instance of the logic control program.

The following describes exemplary types of communication the logic engine sends to the application. An acknowledgement message is returned for every item that is sent to the application that has the acknowledgement flag set in its identifier. The item that requires acknowledgement will be checked for proper formatting, and data validity. If there are any errors the acknowledgement item will return an error code to indicate the type of error. The acknowledgement may not be returned immediately if certain data elements cannot be resolved at the time an item is downloaded. It may be possible to resolve these items when the download is complete, if the unresolved data item was simply downloaded later. Therefore, an application does not wait on the acknowledgement before continuing with its download. Rather, the application "remembers" which items were to be acknowledged and verify that it receives an acknowledgement for each item.

An event message item is returned whenever a send event action item is processed. This item will contain all the data specified in the event action. In this manner, an application can retrieve and store pertinent data from multiple instances of a logic control program for processing and/or for future reference.

Statistics reporting messages are sent to the application after a start statistics reporting command is received. These statistics will indicate the number of instances of a logic control program that have been started, how many passed and failed, and how many completed. A stop reporting command will stop these messages. These messages will be sent on the interval defined in either the statistics frequency data item of the logic control program, or the set frequency command, whichever was received most recently.

The logic engine provides a rich set of functionality for the processing of state data necessary in switching and other systems. This functionality is provided by a specialized, graphical protocol programming language. The graphical programming environment is used to generate the logic control programs. A logic control program contains actions, transitions, and data. It is possible to quickly and efficiently build applications using the graphical programming environment. Similar with graphically-based service creation environments, the programmer may drag, drop and link graphical icons representing logic building blocks to create a logic control program.

It may be seen from the foregoing the softswitch of the present invention provides an integrated hardware and software solution set that provides the capability to receive signaling messages from any type of network and transmit the messages across a different network, while keeping the existing customer feature set. This solution bridges the gap between packet-based networks and traditional PSTN communications to advance lower cost, and high revenue value-added services.

This solution set allows for the decoupling of service intelligence from transport equipment and unburdens the switch and router hardware of sophisticated call processing tasks, freeing them to concentrate on their main task—transmitting information across a network with minimal transmission delay.

Furthermore, the softswitch of the present invention allows the telecommunications companies, such as CLECs and LECs (competitive local exchange companies and local exchange companies), to use the cheaper Internet protocol/packet networks for transmission of their voice traffic while maintaining features and quality of service where applicable.

In the wireless arena, the softswitch may use multi-point wireless T1 radios from the traditional CDMA (code division multiple access) base station system (BSS) radio to the mobile-service switching center (MSC) or switching vehicle. The protocol used on the wireless T1 radios will be TCP/IP (transmission control protocol/internet protocol) with the wireless gateway located at the CDMA BSS radio facility. Additionally, the softswitch may build the switching vehicle (MSC replacement) in an LAN/WAN (local area network/wide area network) configuration. PSTN (public switched telephone network) gateways will be located on the MSC LAN/WAN. The softswitch allows for a faster radio turn up, seamless hand over within one providers network as well as long distance call capabilities internal to the providers LAN/WAN network.

The solution set also comprises of network management, billing, and LDAP (lightweight directory access protocol) servers. The software development for the solution set (applications, servers, interfaces, translation and routing, etc.) may use object oriented programming software and techniques, such as CORBA, C++, JAVA, ObjectStore (OODBMS), and VisiBroker (CORBA), and the like.

This invention may be used by data communication companies, voice communication companies, ISPs, CLECs, LECs, long distance providers, wireless communication companies, etc., to interface to other networks such as ATM (asynchronous transfer mode), frame relay, SIP, H.323, Internet, voice, wireless, etc. Although the description of the invention and claims describe specific signaling and transport protocols, it is contemplated that the present invention is designed to interface with and handle emerging and future protocols. In addition, the present invention may be implemented in hardware, software or a combination of hardware and software. It should be noted that many of the block diagrams illustrate functional groupings which may be implemented in alternative embodiments.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A softswitch interconnecting networks of different transport protocols, comprising:
    a signaling agent coupled to the networks and operable to receive incoming signaling messages, translate the incoming signaling messages to a call model event, and route the call model event; and
    a call agent in communication with the signaling agent and operable to receive the call model event, request outgoing resources for establishing data sessions, generate outgoing signaling messages, and send the outgoing signaling messages to the signaling agent, the signaling agent further terminating the data sessions on the requested outgoing resources; and
    further comprising a network directory server operable to receive requests for routing information to establish data sessions from the call agent, and provide routing information to the call agent.

2. The softswitch, as set forth in claim 1, further comprising a resource manager operable to receive outgoing resource requests from the call agent, and provide outgoing resource availability responses to the call agent.

3. A softswitch interconnecting networks of different transport protocols, comprising:
    a signaling agent coupled to the networks and operable to receive incoming signaling messages, translate the incoming signaling messages to a call model event, and route the call model event; and
    a call agent in communication with the signaling agent and operable to receive the call model event, request outgoing resources for establishing data sessions, generates outgoing signaling messages, and send the outgoing signaling messages to the signaling agent, the signaling agent further terminating the data session on the requested outgoing resources; and
    further comprising a network directory server operable to receive requests for address resolution to establish data sessions from the call agent, and provide address resolution responses to the call agent.

4. A softswitch interconnecting networks of different transport protocols, comprising:
    a signaling agent coupled to the networks and operable to receive incoming signaling messages, translate the incoming signaling messages to a call model event, and route the call model event; and
    a call agent in communication with the signaling agent and operable to receive the call model event, request outgoing resources for establishing data sessions, generate outgoing signaling messages, and send the outgoing signaling messages to the signaling agent, the signaling agent further terminating the data sessions on the requested outgoing resources; and
    further comprising a network gateway operable to receive request for address locations of called parties in external networks to establish data sessions from the call agent, and provide the address locations to the call agent.

5. A softswitch interconnecting networks of different transport protocols, comprising:
    a signaling agent coupled to the networks and operable to receive incoming signaling messages, translate the incoming signaling messages to a call model event, and route the call model event; and
    a call agent in communication with the signaling agent and operable to receive the call model event, request outgoing resources for establishing data sessions, generate outgoing signaling messages, and send the outgoing signaling messages to the signaling agent, the signaling agent further terminating the data sessions on the requested outgoing resources; and
    wherein the signaling agent comprises:
    a logic control executing a logic control program and operable to process signaling messages of a particular signaling protocol;
    a codec specialized in the signaling protocol of an access network and operable to parse and format signaling messages according to the signaling protocol; and
    a filter operable to filter and route signaling messages from the codec to the logic control.

6. The softswitch, as set forth in claim 5, wherein the signaling protocol is SS7.

7. The softswitch, as set forth in claim 5, wherein the signaling protocol is session initiation protocol.

8. The softswitch, as set forth in claim 5, wherein the signaling protocol is H.323.

9. A softswitch interconnecting networks of different transport protocols, comprising:
    a signaling agent coupled to the networks and operable to receive incoming signaling messages, translate the incoming signaling messages to a call model event, and route the call model event; and
    a call agent in communication with the signaling agent and operable to receive the call model event, request outgoing resources for establishing data sessions, generate outgoing signaling messages, and send the outgoing signaling messages to the signaling agent, the signaling agent further terminating the data sessions on the requested outgoing resources; and further comprising a network gateway which comprises:
- a logic control executing a logic control program and operable to process messages of a particular transport protocol;
- a codec specialized in the transport protocol of a media gateway and operable to parse and format the messages according to the transport protocol; and
- a filter operable to filter and route signaling messages from the codec to the logic control.

10. The softswitch, as set forth in claim 9, wherein the transport protocol is media gateway control protocol.

11. The softswitch, as set forth in claim 9, wherein the transport protocol is Internet protocol device control protocol.

12. The softswitch, as set forth in claim 9, wherein the transport protocol is simple gateway control protocol.

13. The softswitch, as set forth in claim 1, wherein the networks comprise a public switched telephone network.

14. The softswitch, as set forth in claim 1, wherein the networks comprise a packet network.

15. The softswitch, as set forth in claim 1, wherein the networks comprise a wireless network.

16. The softswitch, as set forth in claim 1, wherein the call agent comprises a protocol-independent logic engine operable to execute a function-specific logic control program.

17. The softswitch, as set forth in claim 1, further comprising a billing sub-system in communication with the call agent and operable to generate call detail records.

18. A softswitch interconnecting networks of different transport and signaling protocols, comprising:
- a signaling agent coupled to the networks and operable to receive incoming signaling messages, translate the incoming signaling messages to a call event, and route the call event;
- a call agent in communication with the signaling agent and operable to receive the call event, verify the validity of incoming circuits of inbound calls, generate a request for an outgoing resources for establishing data sessions;
- a network directory server in communication with the call agent and operable to receive the request for an outgoing resource, and provide information on the outgoing resource;
- a network gateway agent operable to receive a request to establish a data session on the selected outgoing resource, and set up an open session; and
- the call agent operable to terminate the data sessions on the requested outgoing resources, and generate a call detail record in response to disconnecting the data session.

19. The softswitch, as set forth in claim 18, further comprising a resource manager operable to receive outgoing resource requests from the call agent, and provide outgoing resource availability responses to the call agent.

20. The softswitch, as set forth in claim 18, wherein the network directory server is further operable to receive requests for address resolution to establish data sessions from the call agent, and provide address resolution responses to the call agent.

21. The softswitch, as set forth in claim 18, wherein the signaling agent comprises:
- a logic control executing a logic control program and operable to process signaling messages of a particular signaling protocol;
- a codec specialized in the signaling protocol of an access network and operable to parse and format signaling messages according to the signaling protocol; and
- a filter operable to filter and route signaling messages from the codec to the logic control.

22. The softswitch, as set forth in claim 21, wherein the signaling protocol is SS7.

23. The softswitch, as set forth in claim 21, wherein the signaling protocol is session initiation protocol.

24. The softswitch, as set forth in claim 21, wherein the signaling protocol is H.323.

25. The softswitch, as set forth in claim 18, wherein the network gateway comprises:
- a logic control executing a logic control program and operable to process messages of a particular transport protocol;
- a codec specialized in the transport protocol of a media gateway and operable to parse and format the messages according to the transport protocol; and
- a filter operable to filter and route signaling messages from the codec to the logic control.

26. The softswitch, as set forth in claim 25, wherein the transport protocol is media gateway control protocol.

27. The softswitch, as set forth in claim 25, wherein the transport protocol is Internet protocol device control protocol.

28. The softswitch, as set forth in claim 25, wherein the transport protocol is simple gateway control protocol.

29. The softswitch, as set forth in claim 18, wherein the networks comprise a public switched telephone network.

30. The softswitch, as set forth in claim 18, wherein the networks comprise a packet network.

31. The softswitch, as set forth in claim 18, wherein the networks comprises a wireless network.

32. The softswitch, as set forth in claim 18, wherein the call agent comprises a protocol-independent logic engine operable to execute a function-specific logic control program.

* * * * *